United States Patent [19]
Morano

[11] Patent Number: 6,003,698
[45] Date of Patent: Dec. 21, 1999

[54] ONE PIECE NIPPLE/RING

[75] Inventor: Emanuel P. Morano, Totowa, N.J.

[73] Assignee: Playtex Products, Inc., Westport, Conn.

[21] Appl. No.: 08/843,311

[22] Filed: Apr. 14, 1997

[51] Int. Cl.[6] .......................... A61J 11/04; B29C 45/00
[52] U.S. Cl. ...................................... 215/11.1; 264/513
[58] Field of Search .................... 215/11.1, 11.3; 267/513

[56] References Cited

U.S. PATENT DOCUMENTS

| | | |
|---|---|---|
| 1,545,436 | 7/1925 | McGeary . |
| 1,632,854 | 6/1927 | Rogers . |
| 1,672,734 | 6/1928 | Reilly . |
| 1,989,060 | 1/1935 | Liddick . |
| 2,638,094 | 5/1953 | Kronish . |
| 2,655,920 | 10/1953 | Cronin . |
| 3,530,979 | 9/1970 | Merrill, Jr. et al. . |
| 3,650,270 | 3/1972 | Frazier . |
| 3,777,753 | 12/1973 | Kesselring et al. . |
| 3,779,413 | 12/1973 | Pickerell et al. . |
| 3,790,017 | 2/1974 | Fitzpatrick et al. . |
| 4,195,638 | 4/1980 | Duckstein . |
| 4,238,040 | 12/1980 | Fitzpatrick ............................ 215/11.3 |
| 4,676,386 | 6/1987 | Phlaphongphanich ................. 215/11.1 |
| 4,815,615 | 3/1989 | Phlaphongphanich ................. 215/11.1 |
| 5,542,922 | 8/1996 | Petterson et al. .................. 215/11.1 X |
| 5,544,766 | 8/1996 | Dunn et al. ............................ 215/11.1 |

FOREIGN PATENT DOCUMENTS

| | | |
|---|---|---|
| 2219909 | 4/1972 | Germany . |
| 1-313056 | 12/1989 | Japan . |
| 2-264660 | 10/1990 | Japan . |
| 7001730 | 8/1971 | Netherlands .......................... 215/11.1 |
| 2208291A | 3/1989 | United Kingdom . |
| WO 86/06273 | 11/1986 | WIPO . |
| 9413251 | 6/1994 | WIPO .................................. 215/11.1 |

*Primary Examiner*—Sue A. Weaver
*Attorney, Agent, or Firm*—Ohlandt, Greeley Ruggiero & Perle, L.L.P.

[57] ABSTRACT

A unitary nipple and retaining ring having a nipple made of a first material, with a retaining ring made of a second material and having at least one aperture. The nipple is affixed to the retaining ring, and a portion of the first material of the nipple engages the aperture or apertures of the retaining ring, thus forming a durable bond between the nipple and the retaining ring.

41 Claims, 5 Drawing Sheets

ONE PIECE NIPPLE/RING

The present invention relates to an integral nipple and retaining ring for use with holders or bottles for dispensing baby formula and the like. More particularly, this invention relates to a nipple and retaining ring formed of disparate materials and fused together into a unit that is strong and easy to hold.

BACKGROUND OF THE INVENTION

Baby bottles with attached flexible nipples are commonly used to feed babies formula, water, and other liquids. The basic bottle is a hard bottle, such as a glass or plastic bottle, that is sterilized and filled with liquid. A nipple is then attached to the bottle and the assembly is ready for use. The nipple can include, for example, a threaded section to be directly attached to the bottle. Alternatively, a separate retaining ring can be used to affix the nipple to the bottle.

A popular alternative to a hard bottle is the disposable liner (also referred to as a "disposable bottle") used in conjunction with a support or holder. The liner comes pre-sterilized and is inserted into the holder. The liner is then filled with liquid, and the nipple is usually attached to the holder by a retaining ring, as discussed above. When a liner is used, the nipple or retaining ring typically is also used to secure the liner to the bottle assembly.

The use of a separate retaining ring has certain advantages. One such advantage is that the separate retaining ring can be made of different, sturdier material than that of the nipple. However, many consumers prefer the ease and simplicity of a one-piece unit, which minimizes the number of pieces that must be, for example, cleaned or packed for trips. Thus, various attempts have been made in the art to provide one-piece nipple and retaining ring as a unit.

As discussed above, the nipple itself may have a threaded flange for direct connection to the bottle. Such structures are typically not sturdy enough to endure heavy sucking or repeated use, and are conducive to leakage and spills. Other attempts have been made to adhere nipples to retaining rings. These designs have also been subject to leakage and spills, as the separate pieces tend to pull apart over time.

Accordingly, there is a need for a one piece nipple/ring that is formed of two different materials, yet is securely bonded or integrally formed to provide enhanced durability.

SUMMARY OF THE INVENTION

Against the foregoing background, it is a primary object of the present invention to provide a one piece nipple/ring having improved durability.

It is a further object of the present invention to provide such a one-piece nipple/ring that offers improved grippability.

It is yet a further object of the present invention to provide such a nipple/ring that is visibly identifiable and classifiable by flow rate or other criteria.

To the accomplishment of the foregoing objects and advantages, the present invention comprises a one-piece nipple and retaining ring having a nipple made of a first material and including a mounting portion and a retaining ring made of a second material and having at least one aperture. The mounting portion of the nipple is affixed to the retaining ring, and a portion of the first material of the nipple engages the substrate surrounding the aperture or apertures of the retaining ring and forms a durable bond between the nipple and the retaining ring.

DESCRIPTION OF THE PREFERRED EMBODIMENTS

Figure 1:
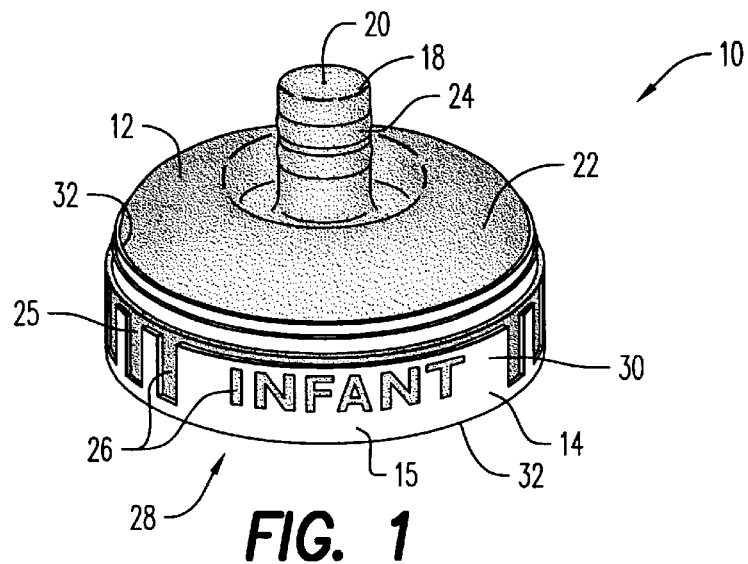
FIG. 1 is a perspective view of a first embodiment one piece nipple/ring of the present invention.
Figure 2:
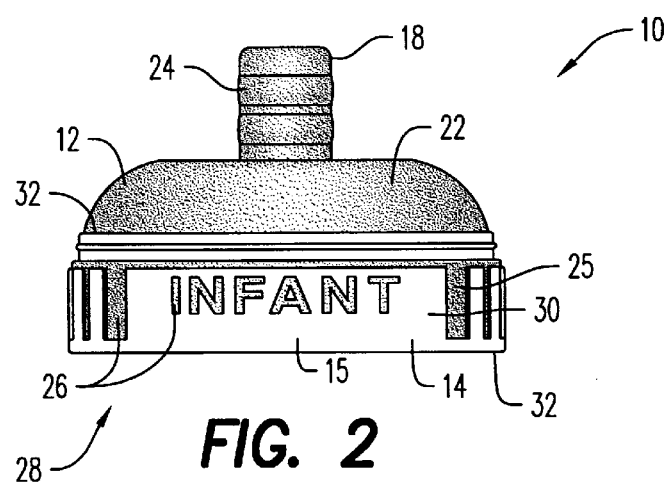
FIG. 2 is a front view of the one piece nipple/ring of FIG. 1, where a rear view would be substantially identical.
Figure 3:
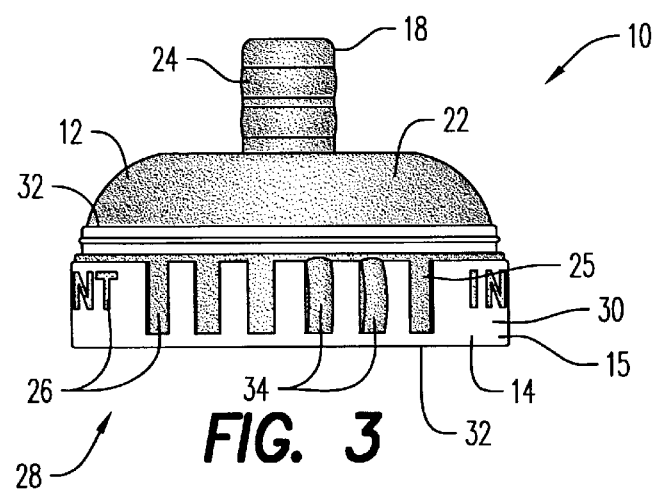
FIG. 3 is a side view of the one piece nipple/ring of FIG. 1, where a second side view would be substantially identical.
Figure 4:
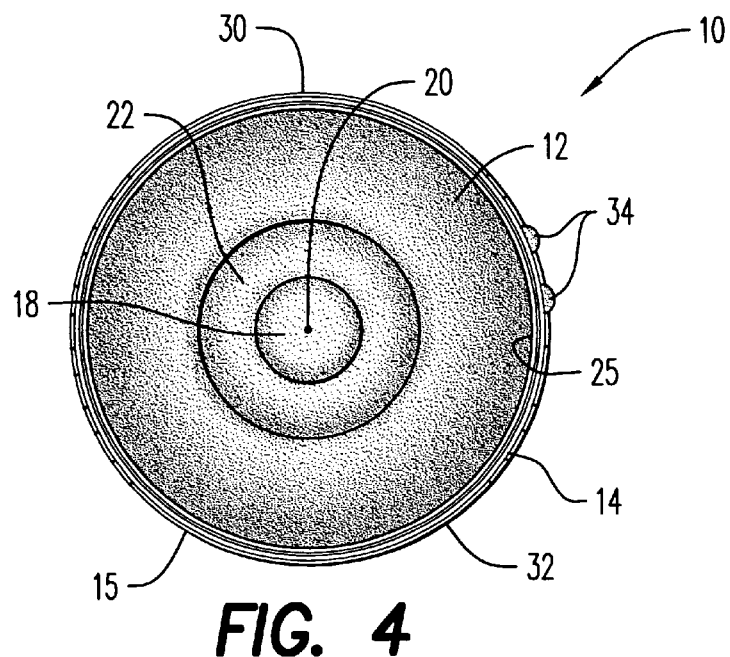
FIG. 4 is a top view of the one piece nipple/ring of FIG. 1.
Figure 5:
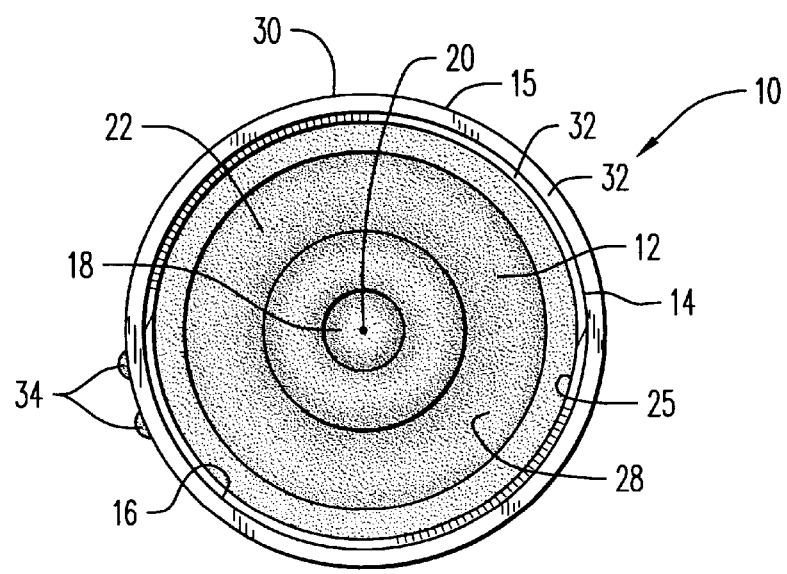
FIG. 5 is a bottom view of the one piece nipple/ring of FIG. 1.

Referring to the drawings, and in particular FIGS. 1–5, there is shown a preferred embodiment one piece nipple/ring according to the present invention generally represented by reference numeral 10. The one piece nipple/ring 10 has two primary portions, the upper or nipple portion 12 and the lower, depending retaining ring portion 14. The two portions 12,14 are preferably fused together to form a single, unitary or integral nipple/ring 10. The nipple/ring 10 is designed to be mounted on a baby bottle or bottle holder (not shown) by means of screw threads 16 (shown in FIG. 5) or other suitable attachment means.

The nipple portion 12 typically includes a nipple stem 18 having a hole 20 or slit (not shown) therethrough to enable the passage of fluid, a base 22, and a mounting portion 25. The nipple stem 18 of FIGS. 1 through 5 includes one or more, and preferably two, horizontal rings or bands 24. Bands 24 enable the baby or other individual being fed to grip the nipple stem 18 effectively with teeth, lips or gums.

Figure 6:
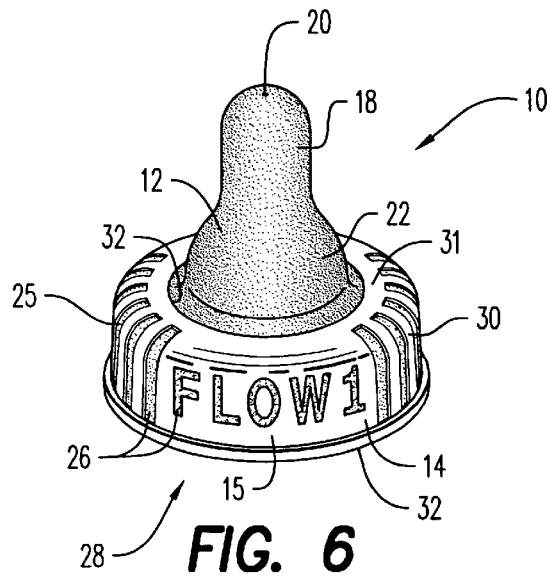
FIG. 6 is a perspective view of a second embodiment one piece nipple/ring of the present invention.
Figure 7:
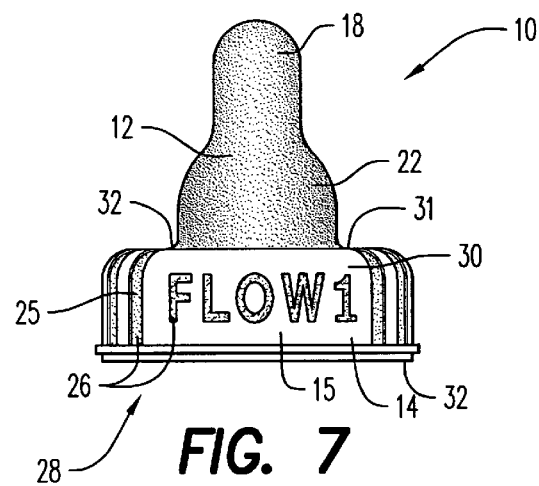
FIG. 7 is a front view of the one piece nipple/ring of FIG. 6, where a rear view would be substantially identical.
Figure 8:
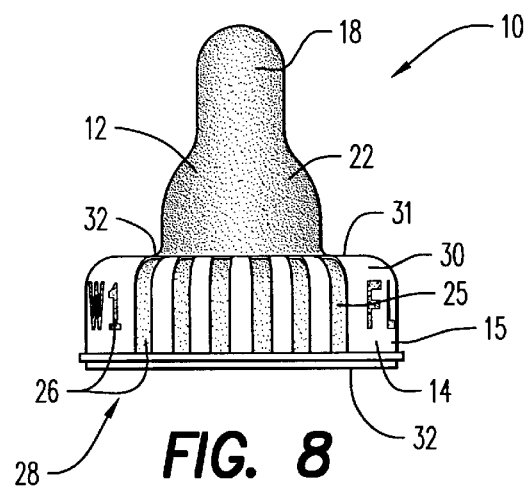
FIG. 8 is a side view of the one piece nipple/ring of FIG. 6, where a second side view would be substantially identical.
Figure 9:
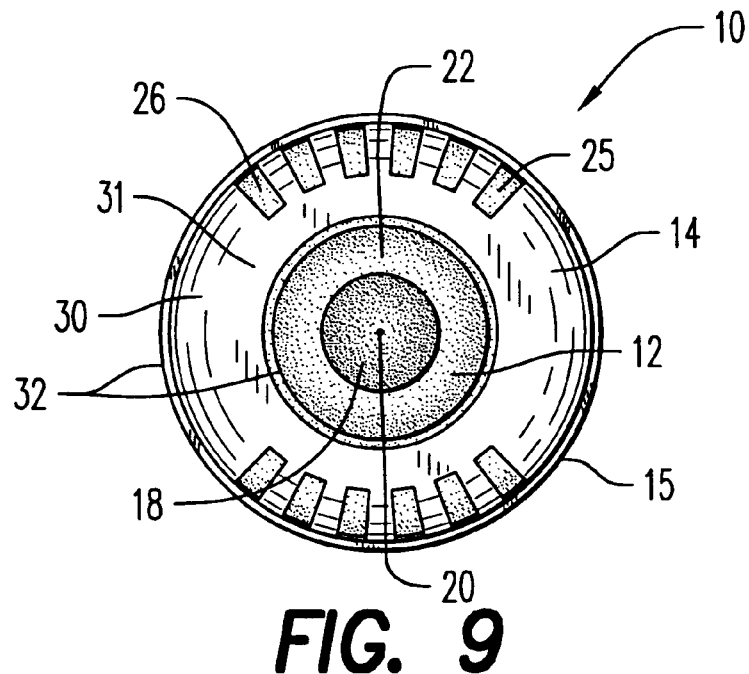
FIG. 9 is a top view of the one piece nipple/ring of FIG. 6.
Figure 10:
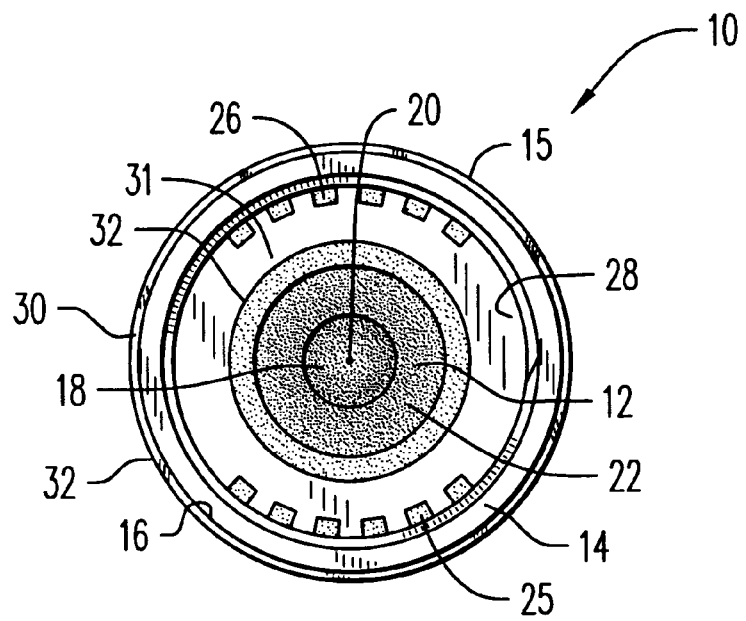
FIG. 10 is a bottom view of the one piece nipple/ring of FIG. 6.
Figure 11:
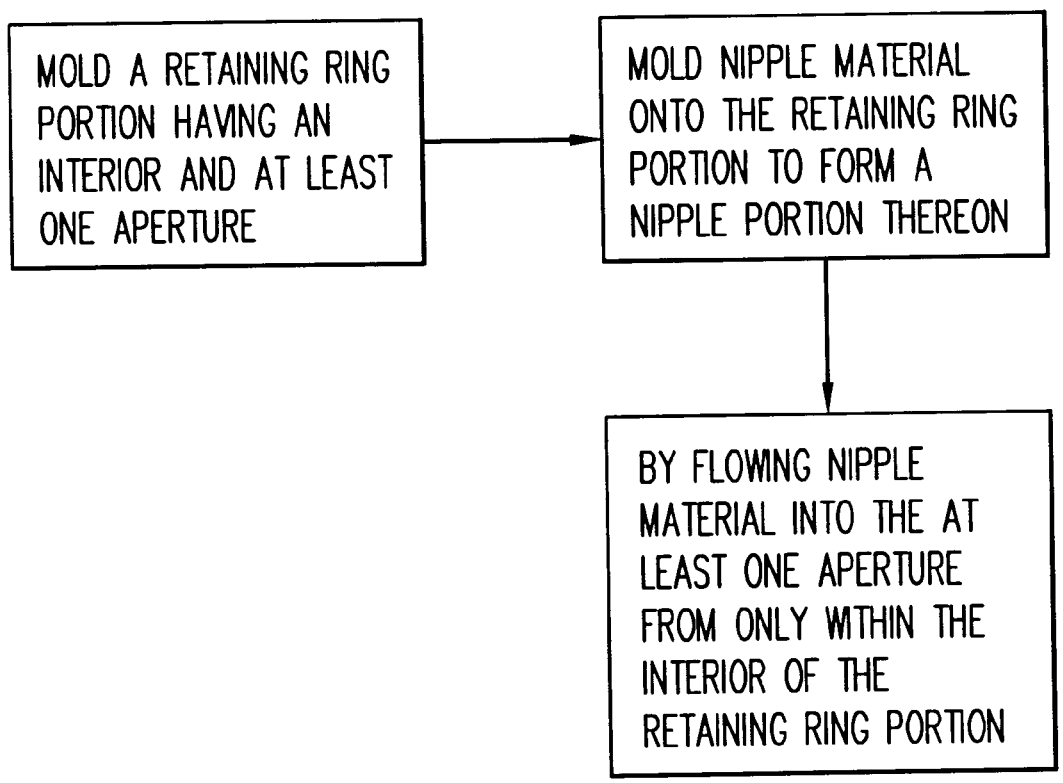
FIG. 11 is a flow chart showing method steps of the invention.

The nipple portion 12 can take on a variety of configurations or shapes, as are known in the art. The embodiments of FIGS. 1 and 6 merely depict two preferred alternatives.

The retaining ring portion 14 preferably is a cylindrical (see FIG. 1) or a curved (see FIG. 6) annular structure that is adapted to be secured to a conventional hard bottle or holder of a disposable bottle. The retaining ring portion 14 has a circumferential or annular flange or sleeve 15 having a central hollow 28 and a pair of rims or edges 32. The hollow 28 is the space within the sleeve 15, between the two edges 32. Sleeve 15 can have a linear, curved, or angled cross-section.

The sleeve 15 has a plurality of apertures 26. The apertures may alternatively be in the form of indentations or notches in one or both rims 32. These apertures 26 most preferably are in the shape of bars, letters, numbers, other symbols, or a combination thereof.

The nipple portion 12 is preferably formed from a flexible, elastomeric material such as a thermoplastic elastomer. Such material is preferably soft and extensible, to make the nipple portion 12 acceptable to the baby being fed. This material is also preferably clear or translucent so that the liquid dispensed can be monitored. Also, the clear or translucent appearance may be preferred by the consumer and enables one to readily determine whether the nipple portion 12 has been thoroughly cleaned.

The retaining ring portion 14 is preferably formed from a sturdy material such as rigid polypropylene. It is also preferred that this material be opaque, to block any view of the threads or other means of attachment. In addition, it is preferred that the retaining ring portion 14 be of a different color than nipple portion 12, to enhance the contrast and visibility of the apertures as discussed more fully below (the shading in the figures designates that the materials can be of different colors, as well as of different materials, as such shading is conventionally used).

The apertures 26 of the retaining ring portion 14 have three primary functions. First, those apertures 26 that are in the shape of letters, numbers and symbols are useful in identifying the product to the user. Nipples are typically marketed to the consumer with varying flow rates, suited to different ages and different foods to be dispensed. Accordingly, it is essential that the user be able to discern readily whether the nipple is appropriate for the particular child and the particular meal. This is particularly significant when the nipples are marketed in a set of graduated flow rates, suitable for a child as it grows from infancy through toddlerhood. Thus, the apertures 26 in the shape of letters, numbers or symbols function to label the type of nipple/ring 10 and, thus, the type of bottle. Preferred labels include "Infant," (see, e.g., FIG. 1) "Toddler," "Flow 1," (see, e.g., FIG. 6) "Flow 2," "Flow 3," and such. Additionally or in the alternative, the material of the retaining ring portion 14 can be color coded to label the nipple/ring unit 10.

The apertures 26 also function to strengthen the bond between the nipple portion 12 and the retaining ring portion 14 that is formed during manufacture. The mounting portion 25 of the nipple portion 12 is typically configured to align with a surface of the retaining ring portion 14. The retaining ring portion 14 is brought into contact and alignment with the nipple portion 12 during manufacture, and the separate portions 12,14 are fused together into single or unitary or integral nipple/ring 10 using means known in the art.

Most preferably, the retaining ring portion 14 will be molded into final form and placed in a separate injection mold. The nipple material is then injected into the mold, where it will take on the shape of the nipple portion 12. The injected nipple material will fill, at least partially, the apertures 26 in the retaining ring portion 14. When the molded nipple/ring 10 is released, the nipple material will be seen in the apertures 26. Co-injection processes can also be used to mold the nipple/ring 10. Alternatively, the two portions 12,14 can be fused under heat to cause the nipple material to flow into the apertures 26. It is also possible to mold the nipple portion 12 to have mating projections that fit within the apertures 26 of retaining ring portion 14. The nipple portion 12 can then be fused or otherwise affixed to the retaining ring portion 14.

The third function of the apertures 26 is a gripping aid. It is important that the nipple/ring 10 be easily grippable, both as part of a bottle assembly during feeding so that the bottle does not slip from the hand of the parent or child, and when attaching and removing the nipple/ring 10 to and from the bottle. When the nipple portion 12 is molded as discussed above, the apertures 26 form discontinuities that improve the grippability of the nipple/ring 10. Depending on the mold used, the nipple material will only partially fill the apertures 26, thus leaving indentations at each aperture that can be used as grips. In the alternative, the nipple material will overfill the apertures 26, forming slight protrusions or ridges 34 (see FIGS. 3 through 5) of nipple material that will extend from the outer surface 30 of the retaining ring portion 14. These protrusions also function as grips. In addition, the nipple material can be even with the apertures 26, giving a flush profile to the nipple/ring 10. The outer surface 30 of the retaining ring portion 14 can also be ridged to enhance grippability of the nipple/ring 10.

Thus, the apertured retaining ring portion 14 of the present invention provides: readily visible labels (particularly useful when the nipple portion 12 and the retaining ring portion 14 are formed of different colored materials); enhanced strength and durability of the bond between the retaining ring portion 14 and the nipple portion 12; and an integral gripping surface; all in a one-piece unit that is easy to use and clean.

FIGS. 6 through 10 show an alternative embodiment to the nipple/ring 10 shown in FIGS. 1 through 5, with the same component having the same reference numeral. The difference between the nipple/ring units of these two embodiments is the shape of the nipple portion 12 and the retaining ring 14. As shown in FIGS. 6 through 10, nipple portion 12 has a bulbous shape so that nipple stem 18 flows into base 22. The base 22 has a greater height than the base shown in FIG. 1. Also, nipple stem 18 of FIG. 6 does not show a band, although a band can be formed thereon. The retaining ring 14 of FIG. 6 has more of a dome-type shape than that of FIG. 1, so that retaining ring 14 has an upper wall 31 and upper rim 32 has a lesser diameter than lower rim 32. Upper wall 31 and upper rim 32 are formed over the top of a portion of base 22 thus giving the retaining ring portion 14 a domed shape as compared to the retaining ring portion of FIG. 1.

It should be understood that, for the purposes of the present invention, the apertures 26 are apertures through the part of the retaining ring portion 14 situated between rims—the sleeve 15 or "wall" of the retaining ring portion 14. Thus, such apertures can also be referred to as wall apertures. The openings defined by rims 32, which define the basic structure of sleeve 15 of the retaining ring portion 14 and lead to central hollow 28, are not considered apertures within the scope of the appended claims.

The invention having been thus described with particular reference to the preferred forms thereof, it will be obvious that various changes and modifications may be made therein without departing from the spirit and scope of the invention as defined in the appended claims.

What is claimed is:

1. A unitary nipple and retaining ring, comprising:

a nipple portion made of a first material; and a retaining ring portion defining a hollow therein and made of a second material, said retaining ring portion having at least one wall aperture for permitting engagement of said nipple portion with said retaining ring portion, wherein a segment of said nipple portion is located within said hollow, a part of said segment of said nipple portion located within said hollow extends into, engages and shows through said at least one wall aperture of said retaining ring portion, and said part is only connected to said nipple portion through said segment.

2. The ring of claim 1, wherein said second material is more rigid than said first material.

3. The ring of claim 1, wherein said at least one aperture is of a shape selected from the group consisting of letters, numbers, bars, symbols, and a combination thereof.

4. The ring of claim 3, wherein said at least one of said apertures is used to identify and label said unitary nipple and retaining ring.

5. The ring of claim 1, wherein a portion of said first material partially fills said at least one aperture of said retaining ring portion.

6. The ring of claim 1, wherein a portion of said first material fills and extends out of said at least one aperture of said retaining ring portion to form a gripping ridge.

7. The ring of claim 1, wherein said first material and said second material are different colors.

8. The ring of claim 1, wherein said at least one aperture forms a gripping surface on said retaining ring portion.

9. The ring of claim 1, wherein said nipple portion and said retaining ring portion are fused together.

10. The ring of claim 9, wherein said nipple and said retaining ring are molded together.

11. The ring of claim 1, wherein said first material includes a thermoplastic elastomer.

12. The ring of claim 1, wherein said first material is transparent.

13. The ring of claim 1, wherein said second material includes a rigid polypropylene.

14. The ring of claim 1, wherein said second material is opaque.

15. The ring of claim 1, wherein said retaining ring portion has a ridged outer surface.

16. The ring of claim 1, wherein said first material engages said at least one aperture of said retaining ring portion in a molten state and subsequently solidifies therein.

17. The ring of claim 1, wherein said first material melts at a temperature lower than a temperature at which said second material melts.

18. The ring of claim 1, wherein said first material and said second material are the same.

19. The ring of claim 1, wherein said retaining ring portion has an upper wall and no portion of said nipple portion overlies said upper wall.

20. The ring of claim 1, wherein said apertures are elongated in an axial direction.

21. The ring of claim 1, wherein said apertures are non-circular.

22. The ring of claim 1, wherein said retaining ring portion has an outer surface and no portion of said nipple portion overrides said outer surface of said retaining ring.

23. The ring of claim 1, wherein said retaining ring portion has a cylindrical sleeve and an upper wall, and no portion of said nipple portion overrides said upper wall of said retaining ring portion.

24. The ring of claim 1, wherein said retaining ring portion has a cylindrical sleeve and an upper wall, and said at least one aperture is in said cylindrical sleeve and extends into a portion of said upper wall.

25. The ring of claim 24, wherein there is a plurality of said apertures, and no portion of said nipple portion overrides said upper wall adjacent said portion of said at least one aperture that extends into a portion of said upper wall.

26. A unitary nipple/ring adapted to be attached to a bottle, comprising:

an elastomeric nipple portion of a first color; and a rigid, retaining ring portion of a second color, said retaining ring portion having a plurality of apertures therethrough;

wherein said apertures form griping surfaces on said unitary nipple/ring, and said apertures have shapes selected from the group consisting of symbols, numbers, letters, and a combination thereof, and said nipple portion extends into at least one of said apertures.

27. The ring of claim 26, wherein said retaining ring portion has a cylindrical sleeve, and said apertures are in said cylindrical sleeve.

28. The ring of claim 27, wherein said retaining ring portion includes an upper wall and said apertures extend from said cylindrical sleeve into a portion of said upper wall.

29. The ring of claim 28, wherein no portion of said nipple portion overlies said upper wall of said retaining ring portion.

30. The ring of claim 26, wherein said apertures are non-circular in shape.

31. The ring of claim 30, wherein said retaining ring portion includes an upper wall and a cylindrical sleeve that depends from the upper wall, and said apertures extend from said cylindrical sleeve into a portion of said upper wall.

32. The ring of claim 26, wherein said retaining ring portion has an upper wall, said apertures are in said upper wall, and no portion of said nipple portion overrides said upper wall of said retaining ring portion.

33. The ring of claim 26, wherein said at least one aperture includes a plurality of apertures in said cylindrical sleeve, and said apertures improve the gripability of the ring.

34. A unitary nipple and retaining ring, comprising:

a nipple portion made of a first material; and a retaining ring portion defining a hollow therein and made of a second material, said retaining ring portion having an upper wall and a cylindrical sleeve depending from said upper wall and having at least one aperture therein for permitting engagement of said nipple portion with said retaining ring portion, wherein a segment of said nipple portion is located within said hollow, and wherein a part of said segment of said nipple portion located within said hollow shows through said at least one aperture in said cylindrical sleeve of said retaining ring portion.

35. The ring of claim 34, wherein said part of said nipple portion that shows through said at least one aperture in said cylindrical sleeve is only connected to said nipple portion through said segment.

36. The ring of claim 34, wherein said at least one aperture is non-circular.

37. The ring of claim 34, wherein said at least one aperture is elongated.

38. The ring of claim 34, wherein no portion of said nipple portion overlies said upper wall.

39. A method of forming a unitary nipple/ring, comprising:

(a) molding a retaining ring portion having an interior and at least one aperture; and (b) molding a nipple material onto said retaining ring portion to form a nipple portion thereon, wherein said nipple material flows into and solidifies within said at least one aperture and shows through said at least one aperture of said retaining ring portion, and said nipple material that flows into and solidifies within said at least one aperture flows only from said interior of said retaining ring portion and does not reconnect exterior of said retaining ring portion to said nipple material that forms said nipple portion.

40. A method of forming a unitary nipple/ring, comprising:
   (a) molding a retaining ring portion having an upper wall and a sleeve depending from said upper wall and having at least one aperture therein; and
   (b) molding a nipple material onto said retaining ring portion to form a nipple portion thereon, wherein said nipple material flows into and solidifies within said at least one aperture and shows through said at least one aperture in said sleeve.

41. The method of claim 40, wherein said nipple material that flows into and solidifies within said at least one aperture of said cylindrical sleeve flows only from said interior of said retaining ring portion.

* * * * *